United States Patent [19]

Ogura

[11] Patent Number: 5,872,604
[45] Date of Patent: Feb. 16, 1999

[54] METHODS AND APPARATUS FOR DETECTION OF MOTION VECTORS

[75] Inventor: Eiji Ogura, Saitama, Japan

[73] Assignee: Sony Corporation, Tokyo, Japan

[21] Appl. No.: 837,491

[22] Filed: Apr. 18, 1997

[51] Int. Cl.$^6$ .................................................. H04N 7/32
[52] U.S. Cl. .......................................................... 348/699
[58] Field of Search .................................. 348/699, 402, 348/407, 413, 416; H04N 7/32

[56] References Cited

U.S. PATENT DOCUMENTS

| | | | |
|---|---|---|---|
| 4,814,755 | 3/1989 | Johnson et al. | 340/709 |
| 4,868,884 | 9/1989 | Miyazaki et al. | 382/30 |
| 5,247,363 | 9/1993 | Sun et al. | 358/167 |
| 5,253,339 | 10/1993 | Wells et al. | 395/126 |
| 5,386,234 | 1/1995 | Veltman et al. | 348/409 |
| 5,440,652 | 8/1995 | Ting | 382/165 |
| 5,461,420 | 10/1995 | Yonemitsu et al. | 348/401 |
| 5,473,379 | 12/1995 | Horne | 348/699 |
| 5,481,553 | 1/1996 | Suzuki et al. | 371/49.1 |
| 5,515,388 | 5/1996 | Yagasaki | 371/49.1 |
| 5,552,831 | 9/1996 | Machida et al. | 348/416 |
| 5,561,532 | 10/1996 | Ohnishi et al. | 386/47 |
| 5,574,800 | 11/1996 | Inoue et al. | 382/149 |
| 5,596,655 | 1/1997 | Lopez | 382/173 |
| 5,604,822 | 2/1997 | Pearson et al. | 382/199 |
| 5,617,487 | 4/1997 | Yoneyama et al. | 382/199 |
| 5,630,037 | 5/1997 | Schindler | 395/131 |
| 5,687,251 | 11/1997 | Erler et al. | 382/133 |
| 5,737,022 | 4/1998 | Yamaguchi et al. | 348/416 |

FOREIGN PATENT DOCUMENTS

| | | | |
|---|---|---|---|
| 0727910 A2 | 8/1996 | European Pat. Off. | H04N 7/68 |

OTHER PUBLICATIONS

H. Sun et al., "Adaptive Error Concealment Algorithm for MPEG Compressed Video," Visual Communications and Image Processing 1992, Boston, SPIE vol. 1818, Nov. 18, 1992, pp. 814–824.

S.H. Lee et al., "Transmission Error Detection, Resynchronization, and Error Concealment for MPEG Video Decoder," Proceedings of the SPIE, vol. 2094, Nov. 8, 1993, pp. 195–204.

K. Popat et al., "Novel Cluster–Based Probability Model for Texture Synthesis, Classification, and Compression," MIT Media Laboratory, Nov. 1993, SPIE vol. 2094, pp. 756–768.

D.C. youla et al., "Image Restoration by the Method of Convex Projections: Part 1–Theory," IEEE Transactions on Medical Imaging, vol. MI–1, No. 2, Oct. 1982, pp. 81–94.

M.I. Sezan et al., "Image Restoration by the Method of Convex Projections: Part 2–Applications and Numerical Results," IEEE Transactions on Medical Imaging, vol. MI–1, No. 2, Oct. 1982, pp. 95–101.

H. Peng et al., "Signal Recovery with Similarity Constraints," Journal of the Optical Society of America, vol. 6, No. 6, Jun. 1989, pp. 844–851.

P. Ferreira et al., "Errorless Restoration Algorithms for Band–Limited Images," IEEE Nov. 1994, pp. 157–161.

J.R. Fienup, "Phase Retrieval Algorithms: A Comparison," Applied Optics, vol. 21, No. 15, Aug. 1, 1982, pp. 2758–2769.

(List continued on next page.)

*Primary Examiner*—Howard Britton
*Attorney, Agent, or Firm*—Limbach & Limbach L.L.P.

[57] ABSTRACT

A method of detecting motion vectors detects motion based upon calculation of picture data of a reference block and upon picture data in a search block, the search block located within a search area and then variably sets the search area. An apparatus for detecting motion vectors includes a motion detection circuit for detection motion based upon calculation of picture data of a reference block and upon picture data in a search block, the search block located within a search area and a circuit for variably setting the search area.

16 Claims, 12 Drawing Sheets

OTHER PUBLICATIONS

A. Papoulis, "A New Algorithm in Spectral Analysis and Band–Limited Extrapolation," IEEE Transactions on Circuits and Systems, vol. CAS–22, No. 9, Sep. 1975, pp. 735–742.

A. Jain et al., "Extrapolation Algorithms for Discrete Signals with Application in Spectral Estimation," IEEE Transactions on Acoustics, Speech and Signal Processing, vol. ASSP–29, No. 4, Aug. 1981, pp. 830–845.

J. Pang et al., "Signal Recovery from Subband Energy Constraints," Journal of the Optical Society of America, vol. 9, No. 7, Jul. 1992, pp. 1041–1051.

R. Schafer et al., "Constrained Iterative Restoration Algorithms," Proceedings of the IEEE, vol. 69, No. 4, Apr. 1981, pp. 432–450.

M. Sezan et al., "Prototype Image Constraints for Set–Theoretic Image Restoration," IEEE Transactions on Signal Processing, vol. 39, No. 10, Oct. 1991, pp. 2275–2285.

R.W. Gerchberg, "Super–Resolution Through Error Energy Reduction," Optica Acta 1974, vol. 21, No. 9, (Received Sep. 13, 1973, Revision Received Jan. 15, 1974) pp. 709–720.

J. Beyerer, "Supression of Stochastically Placed, Straight Toolmarks to Enhance Objects and Defects," Techniques Messen TM 1982–1988, vol. 59, No. 10, Oct. 1992, pp. 389–397.

B. Benson (Editor), "Television Engineering Handbook," McGraw Hill, New York, Publication Date Dec. 1985, pp. 2.7 & 2.8.

S. Inoue, "An Object Extraction Method for Image Synthesis," Proceedings of SPIE, The International Society of Optical Engineering, Conference Date Nov. 1991, vol. J74–D–11, No. 10, pp. 1411–1418.

International Telecommunication Union, ITU–T Telecommunication Standardization Sector of ITU, H.261, "Line Transmission of Non–Telephone Signals — Video Codec for Audiovisual Services at PX 64 KBITS," Mar. 1993, pp. 1–25.

a: REFERENCE FRAME SIGNAL  b: SEARCH FRAME SIGNAL
c: READ CONTROL SIGNAL  d: MOTION VECTOR
e: DIFFERENTIAL FACTOR

HORIZONTAL PROCESS

VERTICAL PROCESS d1,d2: MOTION VECTOR
e1,e2: DIFFERENTIAL FACTOR
f : CORRECT MOTION VECTOR

FIXED SEARCH AREA
(STATIONARY)

VARIABLE SEARCH AREA

B-2  B-1  I0  B1  B2  P3

FIXED SEARCH MODE
(STATIONARY)

AREA 1

HORIZONTAL AND
VERTICAL SEARCH MODE

AREA 2-1

AREA 2-2

AREA 2-3

AREA 2-4

DIAGONAL MOTION MODE

AREA 3-1

AREA 3-2

AREA 3-3

AREA 3-4

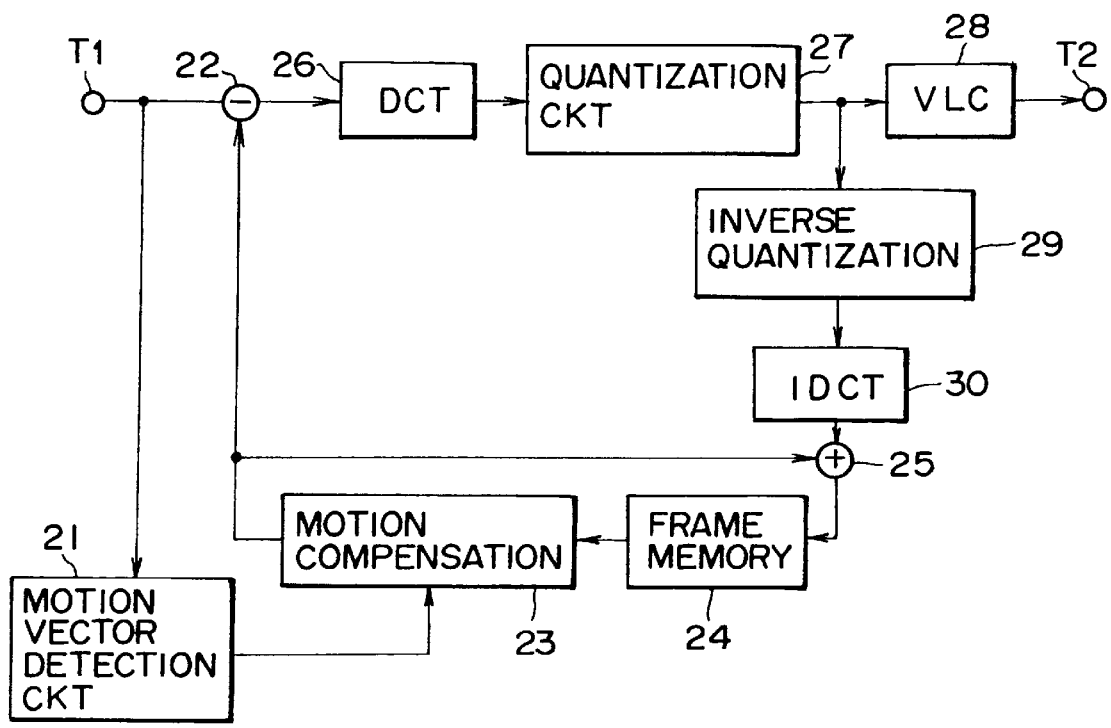
F I G. 13
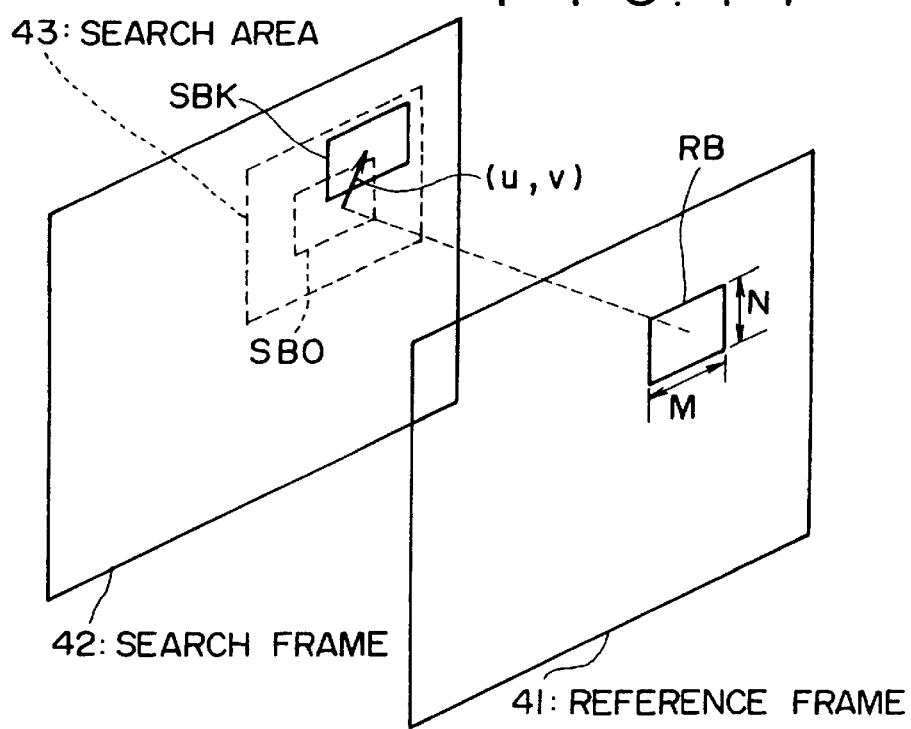
F I G. 14

I0   B1   B2   P3

1 FRAME
H: ±16
V: ±16

2 FRAMES
H: ±32
V: ±32

3 FRAMES
H: ±48
V: ±48

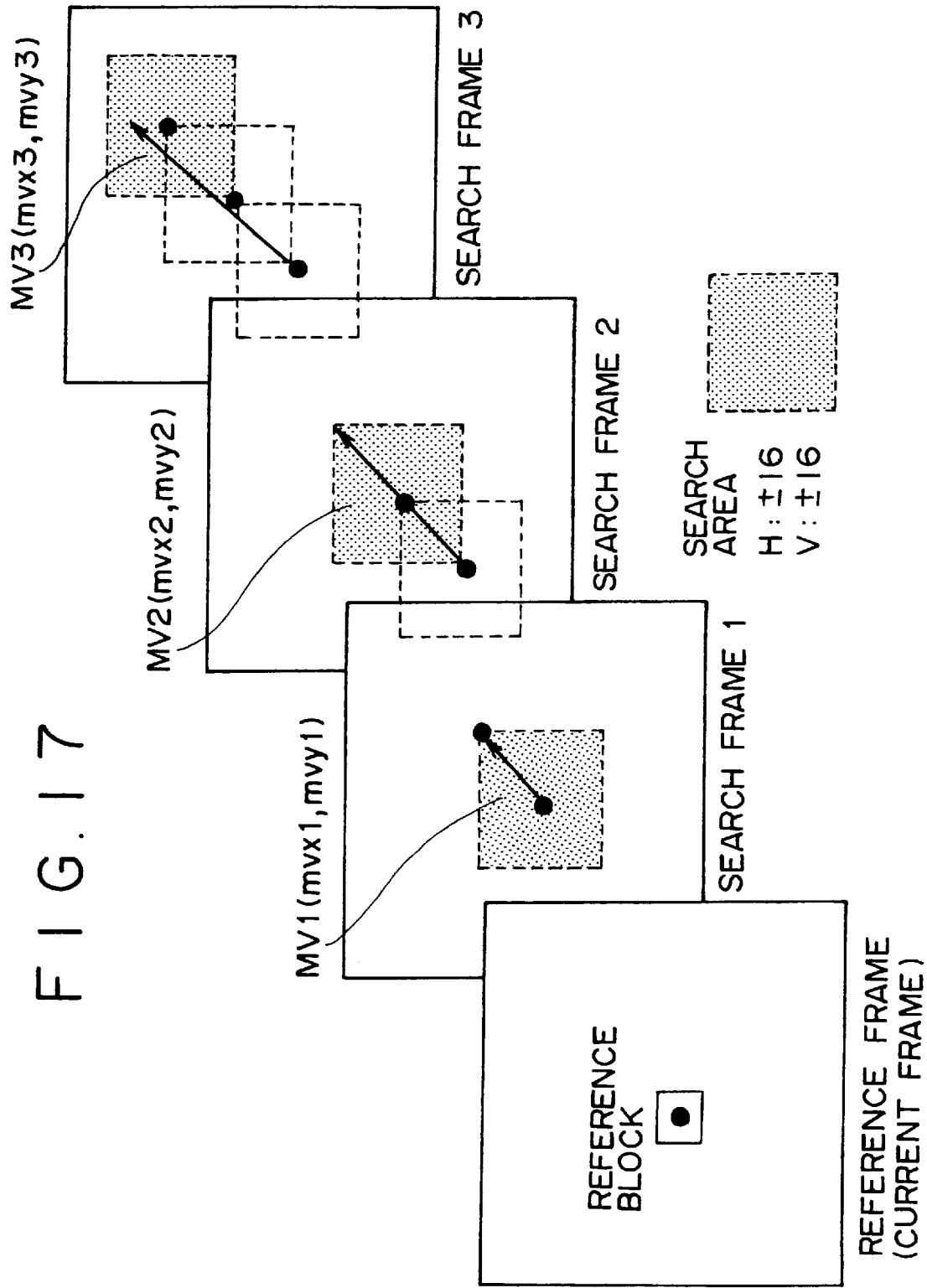

NORMAL SEARCH

TELESCOPIC SEARCH

METHODS AND APPARATUS FOR DETECTION OF MOTION VECTORS

BACKGROUND OF THE INVENTION

1. Field of the Invention

The present invention relates generally to motion compensation, and in particular, to methods and apparatus for the detection of motion vectors.

2. Description of the Related Art

Advances in audio and video compression and decompression techniques, together with very large scale integration technology, have enabled the creation of new capabilities and markets. These include the storage of digital audio and video in computers and on small optical discs as well as the transmission of digital audio and video signals from direct broadcast satellites.

Such advances were made possible, in part, by international standards which provide compatibility between different approaches to compression and decompression. One such standard is known as "JPEG," for Joint Photographic Expert Group. A later developed standard is known as "MPEG1." This was the first set of standards agreed to by the Moving Pictures Expert Group. Yet another standard is known as "ITU-T H.261", which is a video compression standard particularly useful for video teleconferencing. Although each standard is designed for a specific application, all of the standards have much in common.

MPEG1 was designed for the storage and distribution of audio and motion video, with emphasis on video quality. Its features include random access, fast forward and reverse playback. MPEG1 serves as the basis for video compact disks and for many video games. The original channel bandwidth and image resolution for MPEG1 were established based upon the recording media then available. The goal of MPEG1 was the reproduction of recorded digital audio and video using a 12 centimeter diameter optical disc with a bit rate of 1.416 Mbps, 1.15 Mbps of which are allocated to video.

The compressed bit streams generated under the MPEG1 standard implicitly define the decompression algorithms to be used for such bit streams. The compression algorithms, however, can vary within the specifications of the MPEG1 standard, thereby allowing the possibility of a proprietary advantage in regard to the generation of compressed bit streams.

A later developed standard known as "MPEG2" extends the basic concepts of MPEG1 to cover a wider range of applications. Although the primary application of the MPEG2 standard is the all digital transmission of broadcast-quality video at bit rates of 4 Mbps to 9 Mbps, it appears that the MPEG2 standard may also be useful for other applications, such as the storage of full length motion pictures on Digital Video Disk ("DVD") optical discs, with resolution at least as good as that presently provided by 12 inch diameter laser discs. DVD is now sometimes referred to as "Digital Versatile Disk" since it is intended that such disks supplement and/or replace current CD-ROMs since their data storage capacity is much greater.

The MPEG2 standard relies upon three types of coded pictures. I ("intra") pictures are fields or frames coded as a stand-alone still image. Such I pictures allow random access points within a video stream. As such, I pictures should occur about two times per second. I pictures should also be used where scene cuts (such as in a motion picture) occur.

P ("predicted") pictures are fields or frames coded relative to the nearest previous I or P picture, resulting in forward prediction processing. P pictures allow more compression than I pictures through the use of motion compensation, and also serve as a reference for B pictures and future P pictures.

B ("bidirectional") pictures are fields or frames that use the most closest (with respect to display order) past and future I or P picture as a reference, resulting in bidirectional prediction. B pictures provide the most compression and increase signal to noise ratio by averaging two pictures. Such I, P and B pictures are more thoroughly described in U.S. Pat. Nos. 5,386,234 and 5,481,553, both of which are assigned to Sony Corporation, and said U.S. Patents are incorporated herein by reference.

A group of pictures ("GOP") is a series of one or more coded pictures which assist in random accessing and editing. A GOP value is configurable during the encoding process. Since the I pictures are closer together, the smaller the GOP value, the better the response to movement. The level of compression is, however, lower.

In a coded bitstream, a GOP must start with an I picture and may be followed by any number of I, P or B pictures in any order. In display order, a GOP must start with an I or B picture and end with an I or P picture. Thus, the smallest GOP size is a single I picture, with the largest size of the GOP being unlimited.

Both MPEG1 and MPEG2 rely upon a video compression coding method utilizes discrete cosine transformation, motion estimation and variable length coding.

In further detail, in the picture coding apparatus of FIG. 13, picture data is supplied to an input terminal T1. This picture data is inputted to motion vector detection circuit 21 and to subtraction circuit 22. Motion vector detection circuit 21 detects or finds a motion vector based upon the reference frame and the search frame using the inputted picture data. Motion vector detection circuit 21 then provides the motion vector to motion compensation circuit 23. As explained further below, picture data of the reference frame is stored in a frame memory 24, and such stored picture data is supplied to motion compensation circuit 23. Such stored picture data changes as the content of the reference frame changes.

Motion compensation circuit 23 compensates for motion from frame to frame based upon the picture data from frame memory 24 and the motion vector provided by motion vector detection circuit 21. The output of motion compensation circuit 23 is provided to subtraction circuit 22 and to an addition circuit 25. Subtraction circuit 22 generates error data based upon the difference between the inputted data and the motion compensated data output from motion compensation circuit 23. This error data is provided to a discrete cosine transform ("DCT") circuit 26, which orthogonally transforms such error data. The orthogonally transformed error data is then provided to a quantization circuit 27. Quantization circuit 27 quantizes such orthogonally transformed error data. The output of quantization circuit 27 is then provided to variable length coding circuit 28. Variable length coding circuit 28 variable length codes the output of quantization circuit 27 provides such coded data to an output terminal T2.

The output of quantization circuit 27 is also provided to inverse quantization circuit 29. Inverse quantization circuit 29 inverse quantizes the output of quantization circuit 27. The output of inverse quantization circuit 29 is then provided to an inverse discrete cosine transform ("IDCT") circuit 30, which inverse orthogonally transforms the output of inverse quantization circuit 29. The result is that the original error data output from subtraction circuit 22 is essentially regenerated or estimated and is then provided to addition circuit 25. Addition circuit 25 adds this estimated error data to the output data of motion compensation circuit 23. As stated above, motion compensation circuit 23 compensates for motion from frame to frame based upon the picture data which from frame memory 24 and the motion vector provided by motion vector detection circuit 21. The picture data thus stored in frame memory 24 is picture data of the following reference frame.

A known method of detecting a motion vector in the picture coding apparatus of FIG. 13 is known as a block matching method The block matching method divides a frame into the small rectangular area ("block") and detects a motion for every block. Such a block, for example, consists of 8 picture elements horizontally by 8 picture elements vertically, for a total of 64 picture elements within such block. Such picture elements are also often referred to as "pixels" or "pels."

With reference now to FIG. 14, the block matching method is explained. The block matching method establishes a reference block RB in reference frame. The block matching method also establishes a search block SB0 within a search frame 42, where the size of search block SB0, M×N, is the same as that of reference block RB in reference 41. Search block SB0 is moved within a fixed search area 43 in order to find the highest degree of correlation between the search block SB and the reference block RB. Once this highest degree of correlation is found (at search block SBk, for example), a motion vector (u,v) is determined based upon the amount of horizontal and/or vertical displacement from the search block SB0 in reference frame 41 to search block SBk. Thus, when search block SB0 is shifted by motion vector (u,v), the degree of correlation between reference block RB and search block SBk is basically highest. Stated differently, the correlation is highest in the position where search block SB0 is shifted by the motion vector (u,v), where search block SB0 is initially in the position which is the same as reference block RB. The block matching method bases the degree of correlation upon the difference in absolute values of each pixel.

With respect to MPEG, the block matching method is applied to each frame of group of pictures. With reference now to FIG. 15, I0 is an I picture which serves as a reference frame. P3 is P picture which is a reference frame which includes motion with respect to the I picture. Picture B1 which is B picture which can function as a search frame, by detection of motion in both the direction from picture I0 and the direction from picture P3. Similarly, picture B2 is B picture which can function as a search, by detection of motion in both the directions from picture I0 and the direction from picture P3.

With reference now to FIGS. 16A, 16B and 16C, generally, for the block matching method, it is desirable for the size of the search area to be proportional to the interval between the reference frame and the search frame. This is due to the fact a greater amount of motion is more likely to occur if the interval between frames is greater. For example, when the search area for an interval of one frame is 32×32 pixels (±16 horizontally by ±16 vertically) as shown in FIG. 16A, if the interval is two frames, it is desirable that the search area be 64×64 (±32 horizontally by ±32 vertically) pixels in size as shown in FIG. 16B. Similarly, when the interval is three frames, it is desirable that the search area be 96×96±48 horizontally by ±48 vertically pixels in size as shown in FIG. 16C. However, when the search area is selected to be proportional to the frame interval in this way, the size of the search area is increased by 4 times in the case of a two frame interval, and is increased 9 times in the case of a three frame interval, when compared with the size of the search area for an interval of one frame. In other words, because of the size of the search area, in order to detect a motion vector for the frame P3 from the I0 reference frame, a large quantity of data must be processed to determine the best correlation.

A method referred to as "telescopic search" is known as a way of expanding a search area without increasing the amount of data to be transferred and/or processed. With the telescopic search, the range which is searched is one which essentially covers a large search area by always using a 32×32 (±16 horizontally by ±16 vertically) pixel search block, where the center of the search block is successively offset for each successive frame from the reference frame. For example, as shown in FIG. 17, when searching at the search frame 1 (which is 1 frame to the right of the reference frame), the search area has an area of 32×32 pixels. Utilizing the reference block of the reference frame, the telescopic search looks for motion vector MV1 with respect to the reference block. Then, a search area within search frame 2 (which is 2 frames to the right of the reference frame) is established, such that the search area is centered at the coordinates (mvx1, mvy1) of the endpoint of motion vector MV1. The telescopic search then looks for motion vector MV2 within such search area. As shown in FIG. 17, the search area within each of search frames 1, 2 and 3 have an area of 32×32 pixels. Thus, the search area within search frame 2, from the perspective of the reference block, is effectively 64×64 pixels.

Next, a search area within search frame 3 (which is 3 frames to the right of the reference frame) is established such that the search area is centered at the coordinates (mvx2, mvy2) of the endpoint of motion vector MV2. The telescopic search then looks for motion vector MV3 within such search area (which has an area of 32×32 pixels). The search area within the search frame 3, from the perspective of the reference block, is effectively 96×96 pixels. Thus, by utilizing the telescopic search method, required data transfer rate basically that for a search area of 32×32 pixels.

FIGS. 18A and 18B provide a visual comparison of the amount of search data generated by a normal search (i.e., when the search area is proportional to the interval between the reference frame and the search frame) and the amount of data generated by a telescopic search. When establishing a search area in the case of the normal search, because the search area overlaps (indicated by the cross hatching), only that data of the 32×32 picture element reference block which does not newly overlap a horizontally neighboring reference block is transferred. Such a configuration is illustrated by search block RB0 and search block RB1 in FIG. 18A.

Referring now to FIG. 18B, in case of telescopic search, because the search area is different for every search block (i.e., RB0 and RB1), data regarding the search area for every reference block must be forwarded for every set of clock cycles, such as for 256 clock cycles. In other words, if the search area of the telescopic search is 32×32 pixels, data must be forwarded at a rate of 3 times of the search data. When the search area increases in area, e.g., in case of 64×64 pixels, the data must be forwarded at a rate of 5 times of the search data. Thus, if a picture element is represented by 8 bits, and the picture element clock has a frequency of 13.5 MHz, a data transfer rate of 337.5 Mbytes/second ((80×80/256)×13.5 MHz×1 byte=337.5 Mbyte/sec) is necessary. Such a data transfer rate requires expensive hardware.

Additionally, with the telescopic search, if it is determined that the coordinates of the endpoint of the motion vector has its endpoint in the upper right corner of the 96×96 picture element search area, the telescopic search sets the search area to have an area of 32×32 pixels. However, when the horizontal component of the motion vector is relatively small, such horizontal component cannot be detected. In such an instance, picture quality degrades significantly because of the change in the rate necessary to transfer reference data.

Accordingly, it would desirable to provide a method and apparatus for detecting motion vectors which method and apparatus overcome the problems inherent in the block matching method and the telescoping search method.

SUMMARY OF THE INVENTION

It is an object of the invention to provide a method and apparatus for detecting motion vectors.

It is a feature of the invention to detect motion vectors by utilizing variable search areas.

It is an advantage of the invention to reduce the data transfer rate required to detect motion vectors.

According to one aspect of the invention, an apparatus for detecting motion vectors includes a motion detection circuit for detection motion based upon calculation of picture data of a reference block and upon picture data in a search block, the search block located within a search area, and a circuit for variably setting the search area.

According to another aspect of the invention, a method of detecting motion vectors includes the steps of detecting motion based upon calculation of picture data of a reference block and upon picture data in a search block, the search block located within a search area, and variably setting the search area.

The present invention, which is particularly useful for a picture coding apparatus, magnifies or expands a search area without the problem of increasing the transfer rate of reference data which provides for the detection of motion vectors. The motion vector detection methods and apparatus of the present invention detects a motion vector in a reference block unit by calculating picture data in the reference block and picture data in the search block within a search area. A setting means variably sets this search area. In addition, the method of detecting a motion vector of the present invention detects a motion vector in the reference block unit based upon calculations of picture data in the reference block and picture data in the search block in the search area.. The above described search area is set variably based upon the characteristics of motion vectors detected in a plurality of successive reference blocks.

The motion detection circuit for detecting a motion vector in the reference block unit calculates picture data in the reference block and picture data in the search block in the search area. The setting means variably sets the search area variably based on the motion vectors detected in a plurality of successive reference blocks. In addition, the present invention includes a method of detecting a motion vector wherein detection of a motion vector for the reference block is performed by calculating picture data in the reference block and picture data in the search block in the search area. The search area is variably based on a characteristic of the motion vector which is detected in more than one continuing or successive reference block. In case of the present invention, the ideal case is where more than one reference block continues in a horizontal (level) direction or in a vertical (perpendicular) direction.

According to another aspect of the present invention, two independent motion detection circuits are utilized. In such an embodiment, one motion detection circuit operates on a fixed search area of a central part of the search area, and the other motion detection circuit operates on a variable area of the search area. As a result, it becomes possible to effectively detect small motion vectors, even if an error occurs in the variable setting range of the search area. In case of the present invention, when detecting a motion vector among reference pictures which are prior in time to a present picture, the invention detects a motion vector among the reference pictures and which motion vector is shorter than that motion vector in the first reference block detected by the motion detection means. Based upon such detection, the setting means variably sets the search area when detecting a motion vector among the reference pictures which were prior in time based on the detection result.

These and other objects, features and advantages will become apparent when considered with reference to the following description and the accompanying drawings, where like reference numerals refer to the same or similar elements.

BRIEF DESCRIPTION OF THE DRAWINGS

FIG. 13 is a block diagram which illustrates a picture coding apparatus which based on MPEG.

FIG. 14 is a diagram which illustrates a block matching method.

FIG. 17 is a diagram which illustrates a conventional telescopic search.

DETAILED DESCRIPTION OF THE PREFERRED EMBODIMENTS

Figure 1:
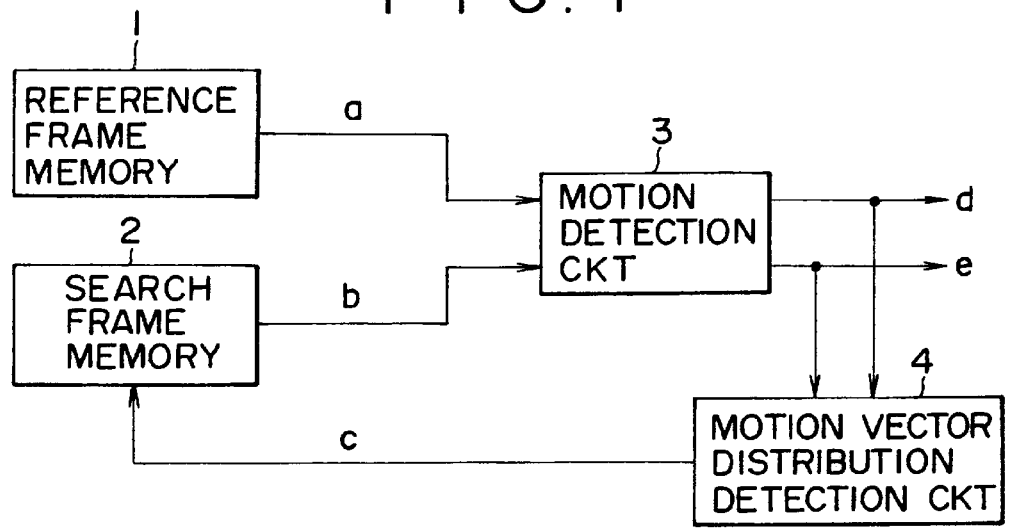
FIG. 1 is a block diagram which illustrates a first embodiment of a motion vector detection apparatus of the present invention.

Referring now to FIG. 1, this first embodiment of a motion vector detection circuit includes a reference frame memory 1, a search frame memory 2, a motion detection circuit 3 and a motion vector distribution detection circuit 4. In operation, reference frame memory 1 stores picture data of the reference frame. Search frame memory 2 picture data of the search frame and also sets a search area in the search block according to a reference data read control signal c which is provided by motion vector distribution detection circuit 4.

Motion detection circuit 3 finds a motion vector d for the reference block based upon reference frame signal a and search frame signal b. Reference frame signal a is provided by reference frame memory 1, while search frame signal b is provided by search frame memory 2. Motion detection circuit 3 looks for this motion vector d by utilizing the block matching method as explained above. That is, it finds motion vector d from the position of the search block based upon the difference in absolute value of every picture element having the same position in both the reference block and in the search block. More specifically, for every such pixel, the motion detection circuit 3 seeks a minimum value for the sum of the square of the difference in absolute value. Once this minimum value has been determined, motion detection circuit 3 outputs motion vector d. Motion detection circuit 3 also outputs a differential factor e equal to the difference represented by this minimum amount. Motion vector distribution detection circuit 4 generates a reference data read control signal c based on the motion vector d and differential factor e. This reference data read control signal c is provided to search frame memory 2.

Figure 2A:
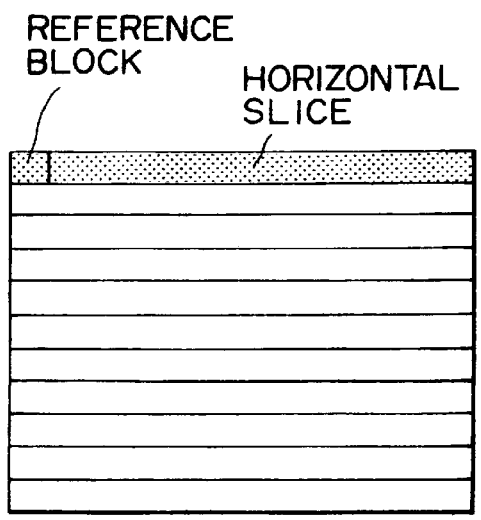
FIG. 2A is an illustration of a reference block of the motion detection circuit of FIG. 1 in regard to a horizontal slice.
Figure 2B:
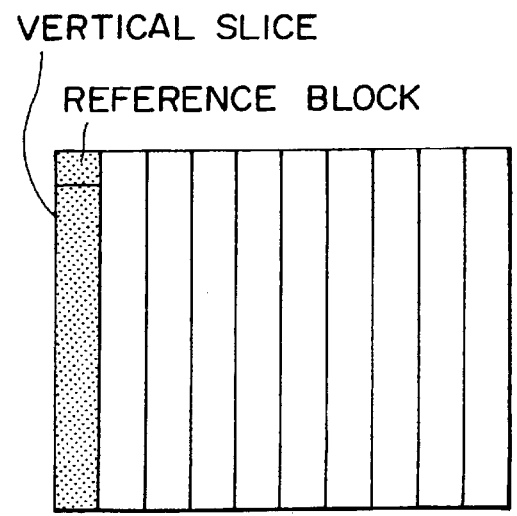
FIG. 2B is an illustration of a reference block of the motion detection circuit of FIG. 1 in regard to a vertical slice.

Referring now to FIGS. 2A and 2B, the search area of the motion detection circuit 3 of FIG. 1 is explained in further detail. FIG. 2A illustrates operation where the reference block moves in a horizontal direction from the upper left corner to the right end of the picture, ending at the upper right corner of the frame. FIG. 2B illustrates operation where the reference block moves in a vertical direction from the upper left corner to the lower left corner, ending at the lower left corner of the frame.

In the following explanation, a continued reference block in the vertical direction is called a perpendicular slice with reference to a continued reference block the horizontal direction. In this embodiment of the invention, the motion detection circuit 3 requires that the motion vector of the reference frame is distributed for every horizontal slice or perpendicular slice, and the motion detection circuit 3 sets a search area in the search frame according to such distribution. In the following explanation, the requirement that a motion vector be distributed for every horizontal slice as shown in FIG. 2A is explained. Since one frame includes 720 (horizontal)×576 (vertical) pixels, and one reference block includes 16×16 pixels, then one frame includes 36 slices, since 576/16=36. (Note that FIG. 2A does not illustrate all 36 slices). Similarly, each slice includes 45 reference blocks since 720/16=45.

For every horizontal slice, motion detection circuit 3 detects a motion vector based upon the reference block and the search block for each search frame. Then in accordance with the detected motion vector, the motion detection circuit 3 sets the search area for the horizontal slice within the reference frame which is equal to or more than 2 frames prior in time to the search frame. For example, the number of the motion vectors which turn up out of 45 motion vectors in a horizontal slice could, for example, establish a search area in an upper direction for the case where the size of the area is selected to be fixed or is selected to exceed a certain value.

An example of this is a situation where a video camera which is supplying a video signal is moved in an upper direction. Since one horizontal slice includes 45 motion vectors (one for each reference block), if a certain number of motion vectors (for example, over 30 motion vectors) indicate the upper direction, the video camera should be moved in this upper direction. Thus, the search area is changed by the history of the motion vectors. Such a method can be described as an adaptive search area direction.

Figure 18A:
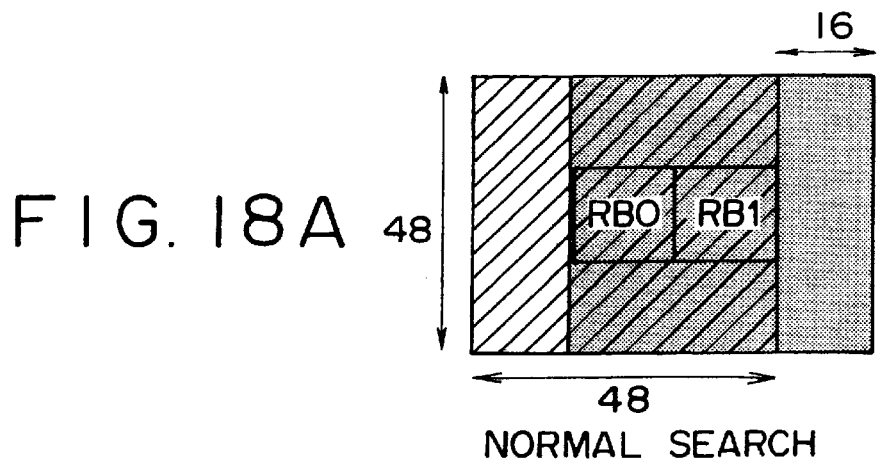
FIGS. 18A and 18B are diagrams which compares data transfer quantity of the block matching with the telescopic search method.
Figure 18B:
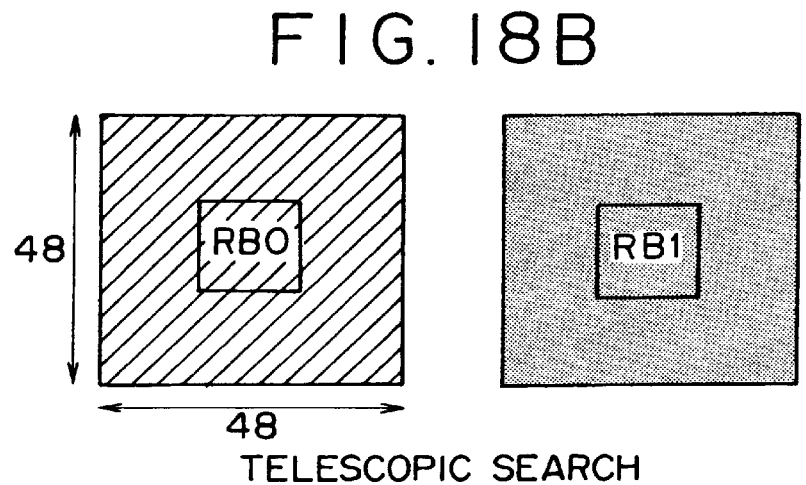
Figure 19:
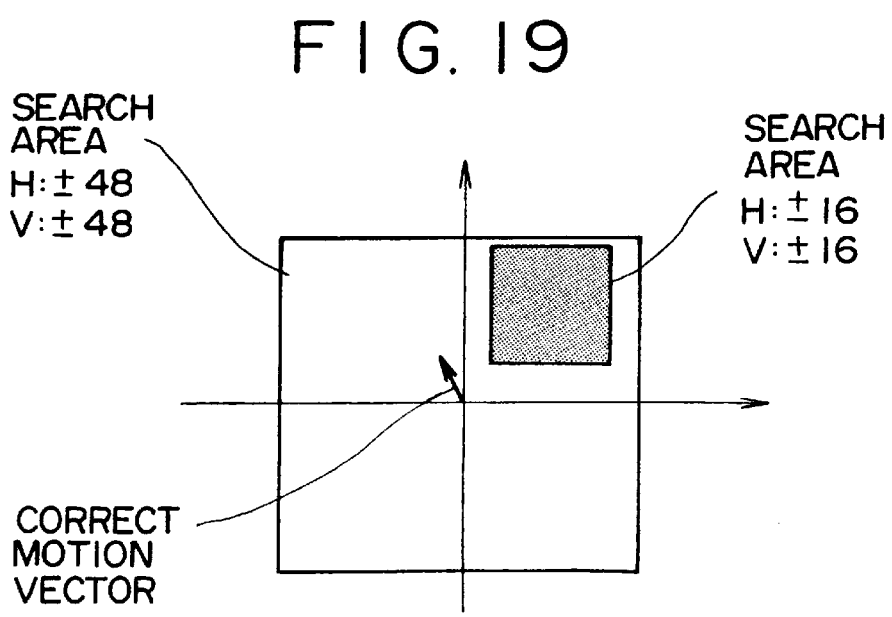
FIG. 19 is a diagram which illustrates a state in which a horizontal component of a motion vector cannot be detected by the telescopic search.

Referring again to FIGS. 18A and 18B, when the search area depends on the telescopic search for every reference block, data for the search area must be transferred for each 256 clock cycles for every reference block. On the other hand, with this form of implementation, the motion detection circuit 3 sets a search area every horizontal slice. Therefore, in the horizontal slice, the motion detection method of the present invention shares a search area among the reference blocks which neighbor in the horizontal (level) direction. Therefore, the reading rate in the case where a fixed search area and the reference picture data is utilized as shown in FIG. 18A is identical.

However, in contrast to the embodiment of FIG. 1, the conventional telescopic search utilizes one individual search area for one reference block. Furthermore, the conventional telescopic search teaches a motion vector search only as between a reference frame and an adjacent frame.

This is significant since with MPEG video a group of pictures consisting of:

I1 B1 B2 P1 B3 B4 P2 B5 . . .

should be sent in a bitstream as

I1 P1 B1 B2 P2 B3 B4 . . .

since the P1 frame is generated from the I1 frame, such that the MPEG encoder must generate the motion vector of the P1 frame before generating the motion vectors of the B1 and B2 frames.

The conventional telescopic search does not, however, utilize a motion vector search between a reference frame and a non-adjacent frame. The embodiment of FIG. 1 effectively performs a telescopic search but utilizes a block matching type of method. More specifically, a fixed search area, for example 16×16 pixels, is determined for every frame having a common area. In spite of having a common area, however, the telescopic search utilizes an individual search area for one reference block.

Figure 3:
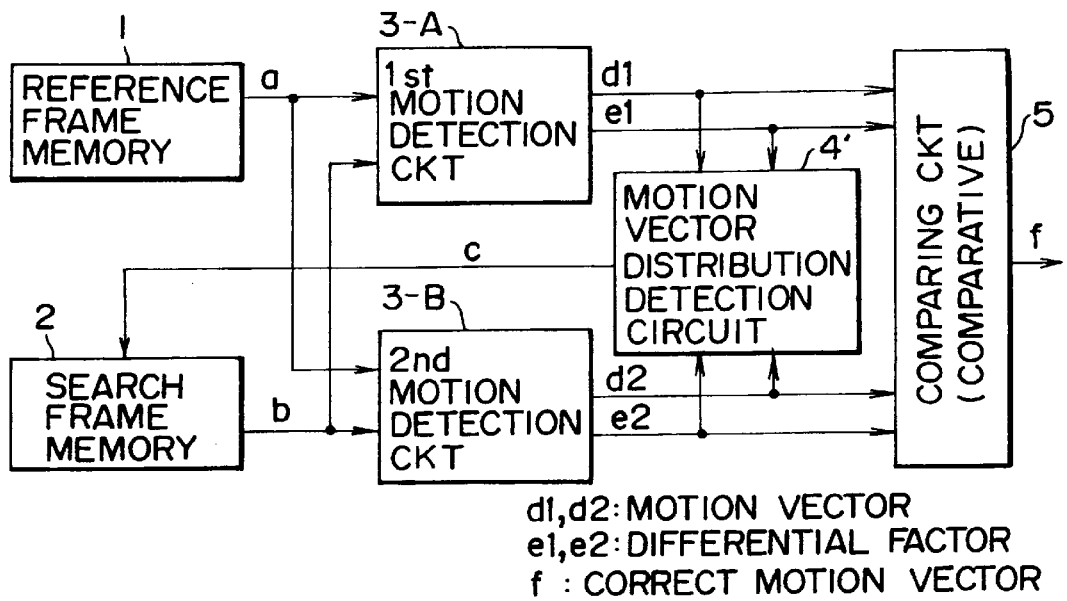
FIG. 3 is a block diagram which illustrates a second embodiment of a motion vector detection apparatus of the present invention.

With reference now to FIG. 3, a second embodiment of the motion vector detection circuit is explained in detail. As with the embodiment of FIG. 1, this second embodiment includes both a reference frame memory 1 and a search frame memory 2. The motion vector detection circuit of FIG. 3 includes a 1st motion detection circuit 3-A and a 2nd motion detection circuit 3-B. A motion vector distribution detection circuit 4' detects the distribution of motion vectors for every slice based upon motion vectors d1 and d2, which are output from the 1st motion detection circuit 3-A and the 2nd motion detection circuit 3-B, respectively. The distribution of motion vectors for every slice is also based upon the differential factor e1 and the differential factor e2, which are output from the 1st motion detection circuit 3-A and the 2nd motion detection circuit 3-B, respectively.

A comparative circuit 5 determines a change vector f based upon the motion vectors d1 and d2 and the differential factors e1 and e2. The 1st motion detection circuit 3-A and the 2nd motion detection circuit 3-B operate to detect motion vectors in different areas. In the embodiment of FIG. 3, the search area of each motion detection circuit 3-A and 3-B is selected, for example, to be ±16 pixels in each of the horizontal and vertical directions.

Figure 4A:
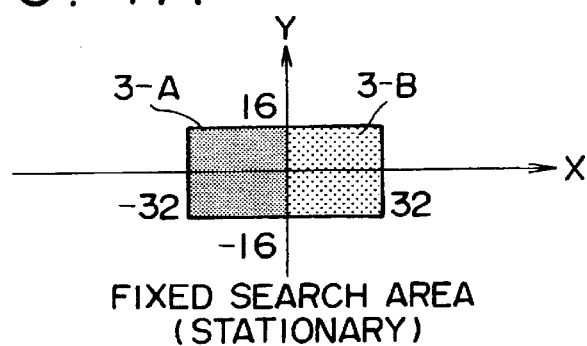
FIGS. 4A and 4B are illustrations of the search areas of the motion detection circuit of FIG. 3.
Figure 4B:
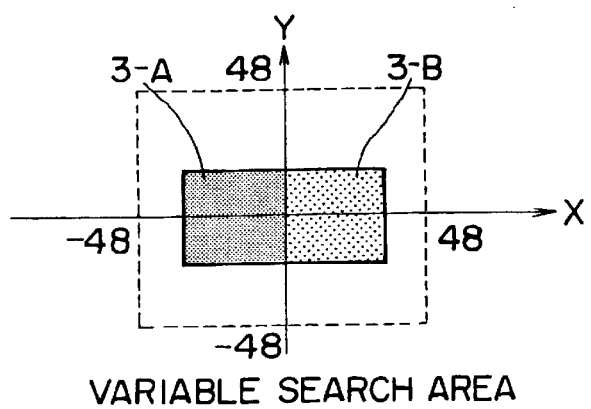

Referring now to FIG. 4A, when setting or fixing a search area, the horizontal direction is set to be larger since it is more likely that motion within video pictures will be horizontal than vertical, as is the case with live stage productions. As shown in FIG. 4A, the indicated search area for 1st motion detection circuit 3-A is to the left of the Y axis, while the indicated search area for the 2nd motion detection circuit 3-B is to the right of the Y axis. In this case, the total search area is thus ±16 pixels in the vertical (perpendicular) direction and ±32 pixels in the horizontal (level) direction. In operation, the motion vector detection circuit of FIG. 3, when making a search area variable for each horizontal slice, fixes the search area of the 1st motion detection circuit 3-A and changes the search area of the 2nd motion detection circuit 3-B. Thus, as shown in FIG. 4B, the search area can be expanded to ±48 pixels in the horizontal (X-axis) direction and ±48 pixels in the vertical (Y-axis) direction.

Figure 5:
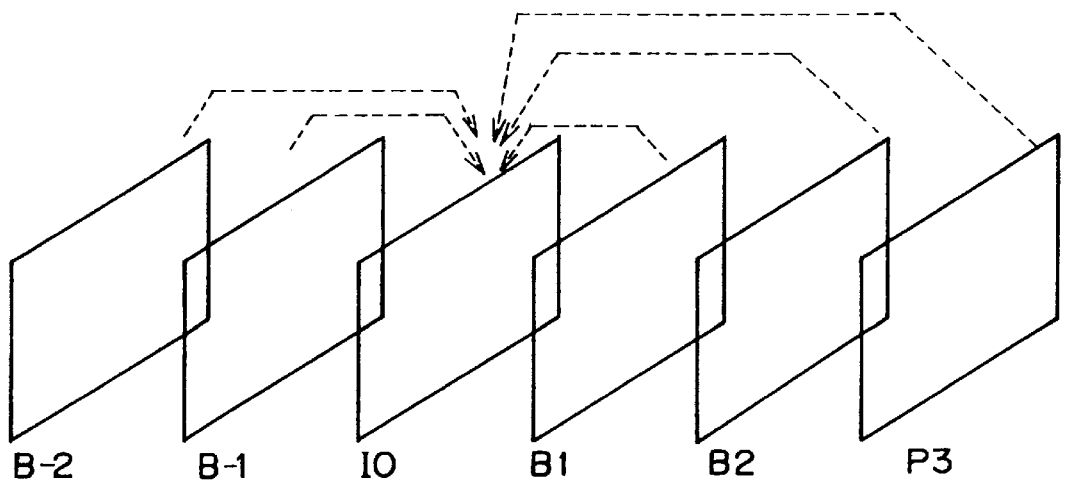
FIG. 5 is an illustration which shows, as between a GOP, an example of motion detection of the motion vector detection circuit of FIG. 3.

With reference now to FIG. 5, the operation of the motion vector detection circuit of FIG. 3 is further explained. Using the 1st motion detection circuit 3-A, the motion vector detection circuit of FIG. 3 detects motion in frame B1 before detecting motion in frame P3. The motion detection circuit 3-A provides the result as the differential factor e1 and motion vector d1 to the motion vector distribution detection circuit 4'. The motion vector detection circuit also detects motion in frame B-2 using the 2nd motion detection circuit 3-B. The search area provided by the 1st motion detection circuit 3-A and the 2nd motion detection circuit 3-B in this case is ±16 pixels horizontally and ±16 pixels vertically. This results in a vector which corresponds to the center of the search range which is (X,Y)=(0,0).

Next, 1st motion detection circuit 3-A detects motion in frame B2, and 2nd motion detection circuit 3-B detects motion in frame B-1. Then, since motion vector distribution detection circuit 4' stores motion detection data with respect to frame I0, using such stored data, the search area for every horizontal slice of frame B1 is changed. Thus, by changing a search area for every slice, it is possible to detect movement in a frame which is 3 frames prior using the result of the motion detection of a frame which is one frame prior.

Figure 15:
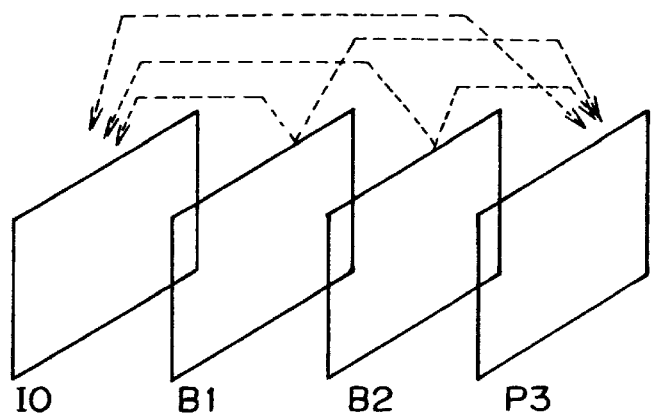
FIG. 15 is a diagram which illustrates an application of motion detection in MPEG.
Figure 16A:
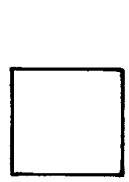
FIGS. 16A, 16B and 16C are diagrams which illustrate the relation between frame interval and the size of a search area.
Figure 16B:
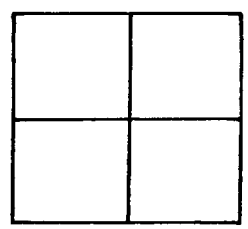
Figure 16C:
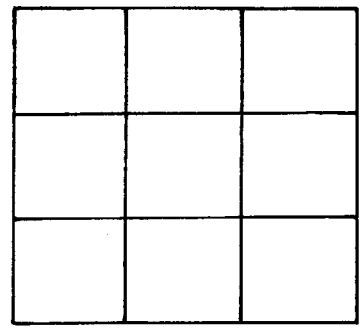

Therefore, by utilizing the result of motion detection of an M frame (for example frame B1 in FIG. 15), which is one frame subsequent to frame I0, motion can be detected in an N frame (frame P3, for example) which is three frames subsequent in time to frame I0. Thus, motion detection is possible where N and M are integers representing the number of frames from an I frame, and where N>M≧1.

Figure 9:
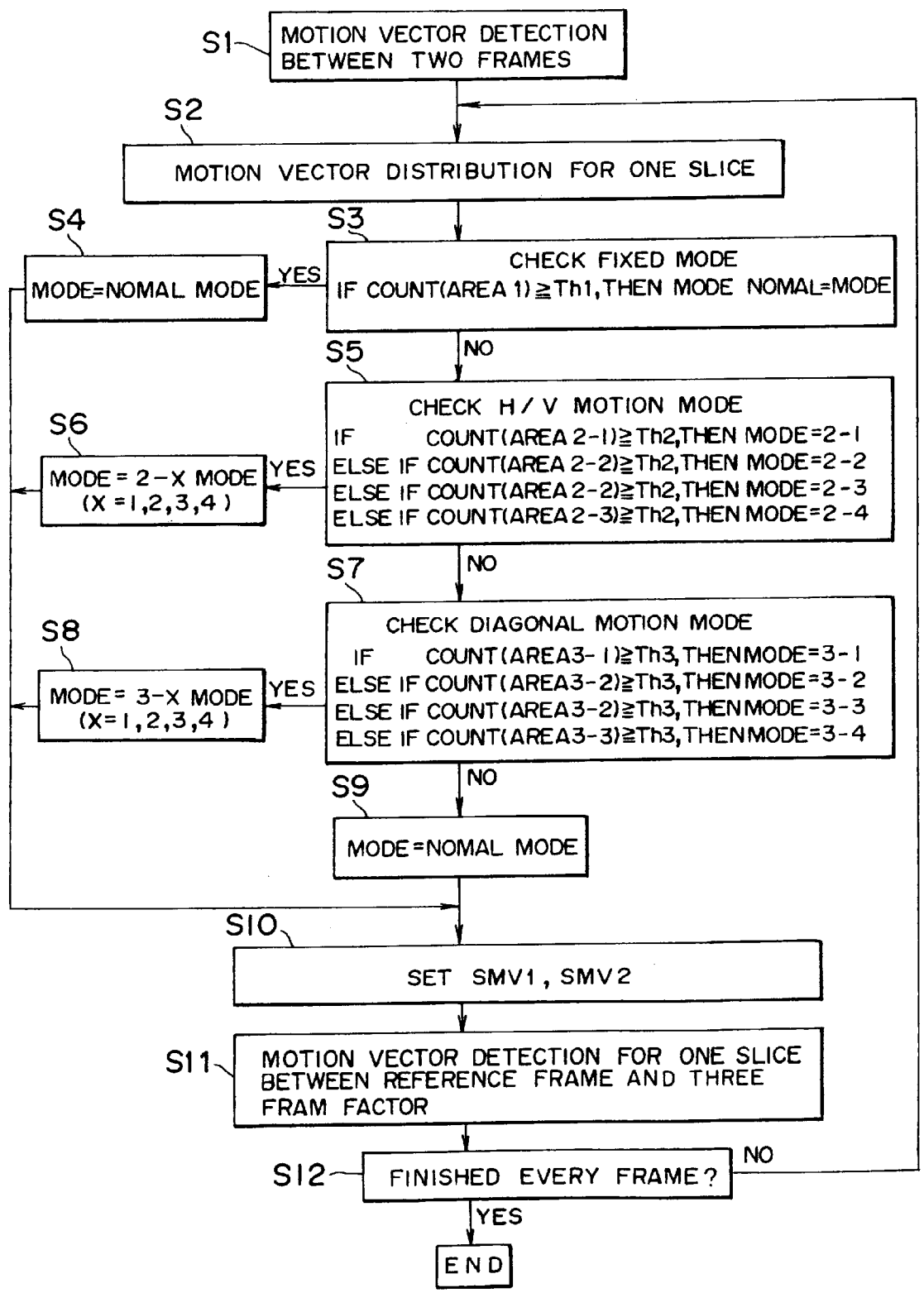
FIG. 9 is a flow chart of the operation of the motion vector detection circuit of FIG. 3.

With reference now to FIG. 9, the operation of the motion vector detection circuit of FIG. 3 is further explained. Step S1 is the start of the detection of motion between adjacent frames such as between I0 and frame B1 as already explained with respect to FIG. 5. Then at step S2 motion vector distribution, based upon the motion detection for 1 slice of one frame is determined by dividing the motion vector search area of ±16 pixels horizontal by ±16 pixels vertical into a small block having a size of ±4 pixels horizontal by ±4 pixels vertical. Then the total number of the motion vectors which are detected for every such small block is counted. Those motion vectors which generate a differential factor larger than a threshold value are not counted because of the low reliability of the information represented by such motion vectors. Next at step S3 based upon such count (for Area 1) it is determined whether the mode is a stationary mode or an active mode. The active mode includes two modes, (1) a horizontal/vertical motion mode and, (2) a diagonal motion mode. To make such the determination, if the count (for Area 1) is greater than or equal to a first threshold value Th1, then the mode is determined to be a stationary mode. Area 1, shown in the central (shaded) portion of FIG. 6B, is a ±4 horizontal by ±4 vertical area. This area 1 is basically a mall area in which motion can occur. If the count is equal to or greater than the first threshold value Th1, the mode is established at step S4 to be a stationary mode, and the search range is set in accordance with step S10 as will be explained below.

Figure 6A:
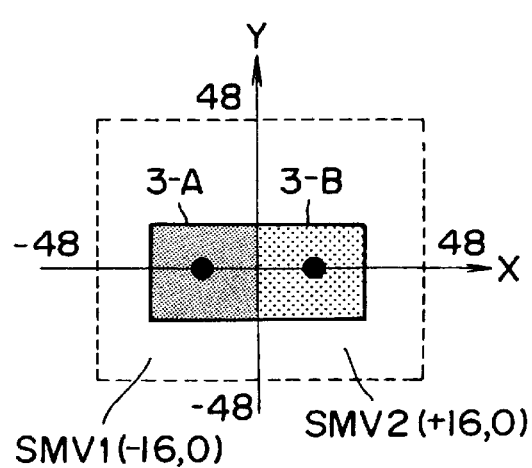
FIGS. 6A and 6B are illustrations of a stationary mode of the motion detection circuit in FIG. 3.
Figure 6B:
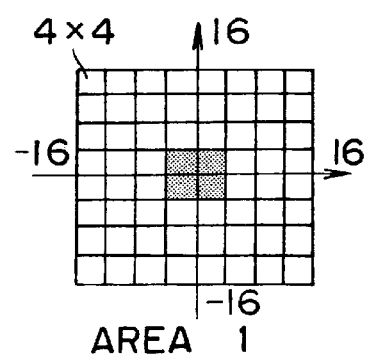

FIG. 6(A) illustrates the search area for the stationary mode. A comparison of FIG. 6A with FIG. 4A illustrates that the search areas of each are the same. For the 1st motion detection circuit 3-A, the central vector in its search range, SMV1, =(mvx1, mvy1) =(−16,0). For the 2nd motion vector detection circuit 3-B, the central vector in its search range, SMV2, =(MVX2, MVY2)=(+16,0).

Returning to step S3, when it is determined that the mode is not a stationary mode, the method proceeds to step S5 where it is determined whether the mode is a horizontal/vertical motion mode. This determination is made based upon whether the total of the motion vectors contained in the areas 2-1, 2-2, 2-3 or 2-4, as illustrated in FIGS. 7B, 7C, 7C and 7E, respectively. More specifically, as shown in FIG. 9, in step S5, it is first determined whether the total of the motion vectors which are contained in area 2-1 is greater than or equal to a second threshold value, Th2. If so, the method proceeds to step S6, where it is placed in a 2-1 search mode. If not, step S5 proceeds to determine whether the total of the motion vectors which are contained in area 2-2 is greater than or equal to the second threshold value, Th2. If so, the method proceeds to step S6, where it is placed in a 2-2 search mode. If not, step S5 proceeds to determine whether the total of the motion vectors which are contained in area 2-3 is greater than or equal to the second threshold value, Th2. If so, the method proceeds to step S6, where it is placed in a 2-3 search mode. If not, step S5 proceeds to determine whether the total of the motion vectors which are contained in area 2-4 is greater than or equal to the second threshold value, Th2. If so, the method proceeds to step S6, where it is placed in a 2-4 search mode. If not, step S5 proceeds to step S7. From step S6, the method proceeds to step S10 where the search area is set in accordance with the search mode.

Figure 7A:
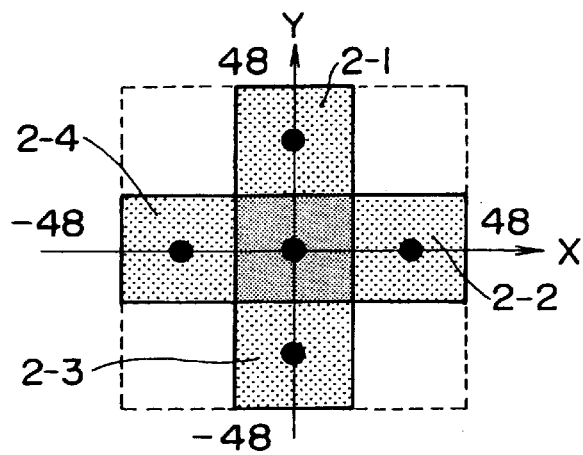
FIGS. 7A, 7B, 7C, 7D and 7E illustrate horizontal/vertical motion modes of the motion detection circuit in FIG. 3.
Figure 7B:
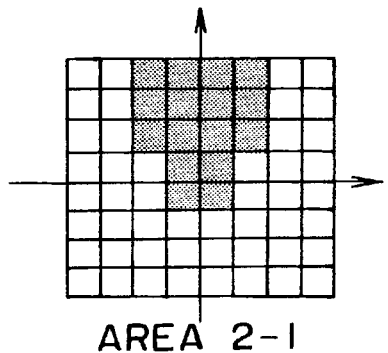
Figure 7C:
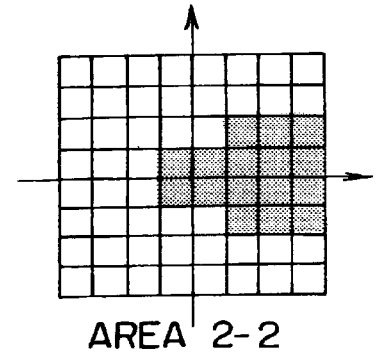
Figure 7D:
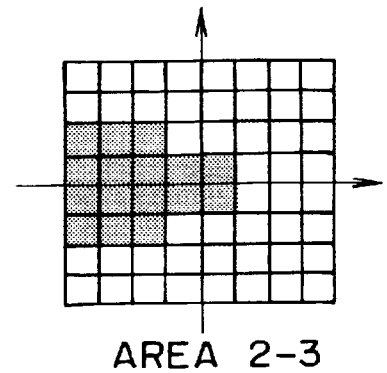
Figure 7E:
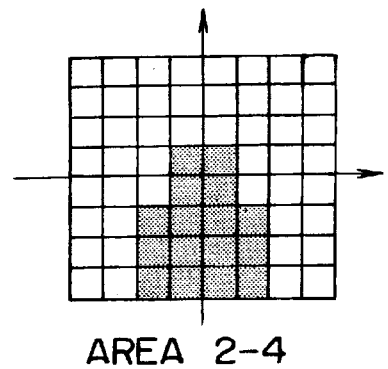

Referring now to FIG. 7A, the search areas for each of search modes 2-1, 2-2, 2-3 and 2-4 are shown. In FIG. 7A the ±16 central search area (shaded area) is the search area of the 1st motion detection circuit 3-A, while the search area of the 2nd motion detection circuit 3-B is one of the search areas 2-1, 2-2, 2-3 or 2-4, each of which are adjacent to the central search area. As illustrated in FIG. 7A, the central vector for each search area can be described as follows:

Mode 2-1 SMV1=(0,0), SMV2=(0,+16)
Mode 2-2 SMV1=(0,0), SMV2=(+16,0)
Mode 2-3 SMV1=(0,0), SMV2=(0,−16)
Mode 2-4 SMV1=(0,0), SMV2=(−16,0).

Referring now to FIGS. 8A, 8B, 8C, 8D, 8E and 9, when the method at step S5 determines the mode is not one of the horizontal/vertical motion modes, the method proceeds to step S7. Step S7 determines whether the mode is a diagonal motion mode. More specifically, as shown in FIG. 9, in step S7, it is first determined whether the total of the motion vectors which are contained in area 3-1 (see FIG. 8B) is greater than or equal to a third threshold value, Th3. If so, the method proceeds to step S8, where it is placed in a 3-1 search mode. If not, step S7 proceeds to determine whether the total of the motion vectors which are contained in area 3-2 (see FIG. 8C) is greater than or equal to the third threshold value, Th3. If so, the method proceeds to step S8, where it is placed in a 3-2 search mode. If not, step S7 proceeds to determine whether the total of the motion vectors which are contained in area 3-3 (see FIG. 8D) is greater than or equal to the third threshold value, Th3. If so, the method proceeds to step S8, where it is placed in a 3-3 search mode. If not, step S7 proceeds to determine whether the total of the motion vectors which are contained in area 3-4 (see FIG. 8E) is greater than or equal to the third threshold value, Th3. If so, the method proceeds to step S8, where it is placed in a 3-4 search mode. If not, step S7 proceeds to step S9. At step S9, since neither a horizontal/vertical motion mode nor a diagonal motion mode has been determined, the mode is reset to be a stationary mode, as would have been the case at step S3 if the count (for Area 1) had been is greater than or equal to a first threshold value Th1. From step S8, the method proceeds to step S10 where the search area is set in accordance with the search mode.

Figure 8A:
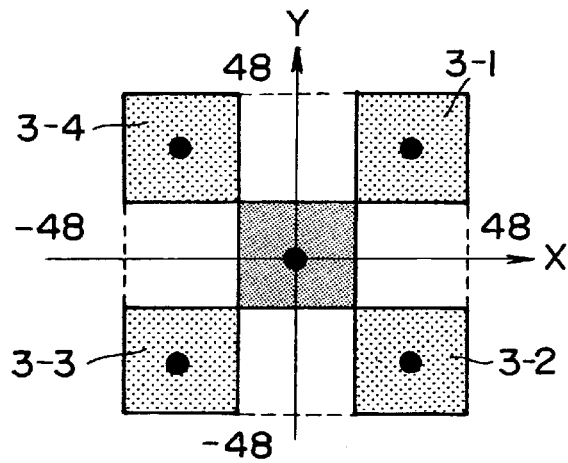
FIGS. 8A, 8B, 8C, 8D and 8E illustrate diagonal motion modes of the motion detection circuit in FIG. 3.
Figure 8B:
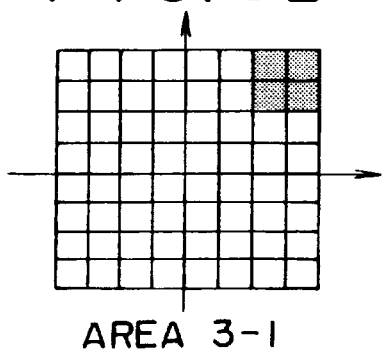
Figure 8C:
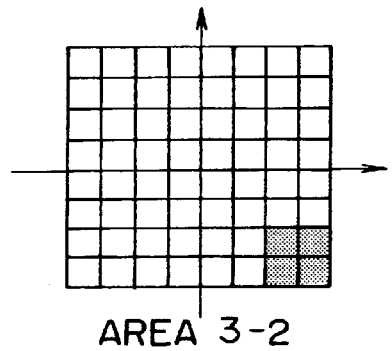
Figure 8D:
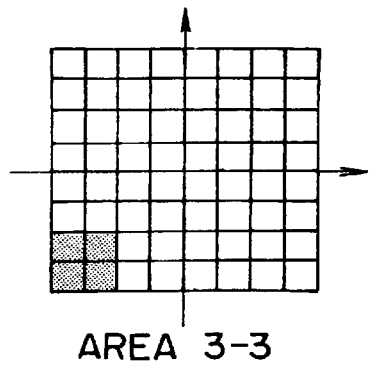
Figure 8E:
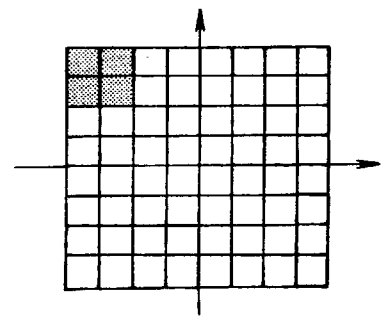

Referring now to FIG. 8A, the search areas for each of search modes 3-1, 3-2, 3-3 and 3-4 are shown. In FIG. 8A the ±16 central search area (shaded area) is the search area of the 1st motion detection circuit 3-A, while the search area of the 2nd motion detection circuit 3-B is one of the search areas 3-1, 3-2, 3-3 or 3-4, each of which are diagonal to the central search area. As illustrated in FIG. 8A, the central vector for each search area can be described as follows:
Mode 3-1 SMV1=(0,0), SMV2=(+16,16)
Mode 3-2 SMV1=(0,0), SMV2=(+16,−16)
Mode 3-3 SMV1=(0,0), SMV2=(−16,−16)
Mode 3-4 SMV1=(0,0), SMV2=(−16,+16).

From step S9, where the mode is set to be a stationary mode, the method proceeds to step S10 where the search area is set in accordance with the stationary mode. In step S10, for a horizontal slice in which motion is detected, for example as between a horizontal slice in frame P3 and in a corresponding horizontal slice I0, the outputs of each of the 1st motion detection circuit 3-A and the 2nd motion detection circuit 3-B are inputted to comparative circuit 5 of FIG. 3, and such comparative circuit 5 outputs as motion vector f the motion vector corresponding in part to the differential factors e1 and e2.

Once the vectors have been set at step S10, the method proceeds to step S11 where motion vector detection occurs for one slice as between the reference frame and the search frame. Once this motion vector detection has been completed at step S12 it is determined whether motion vector detection has been completed for all slices of the frames from which motion vectors are detected. If the motion vector detection has been completed, then the method proceeds to "END." If the motion vector detection has not been completed, the method returns to step S2 to begin motion vector detection in regard to the another slice.

Thus, the motion vector detection circuit of FIG. 3 utilizes a variable search area while always covering a centrally located block, having dimensions of, for example, ±16 pixels both horizontally and vertically. Therefore, in the event of an error in mode determination, the motion vector detection circuit of FIG. 3, particularly in the case of small levels of motion, is less likely to cause a degradation in picture quality. Furthermore, with the motion vector detection circuit of FIG. 3, although it relies upon a stationary mode, horizontal/vertical motion mode, and a diagonal motion mode, it is possible to also utilize other motion modes where the shape of the respective search area is related to the type of motion to be detected. Furthermore, although the motion vector detection circuit of FIG. 3 has been described with respect to motion vector detection between the I0 frame and the B1 frame, the motion vector detection circuit may be used for motion vector detection in regard to other reference frames (or fields) and other search frames (or fields).

Figure 10:
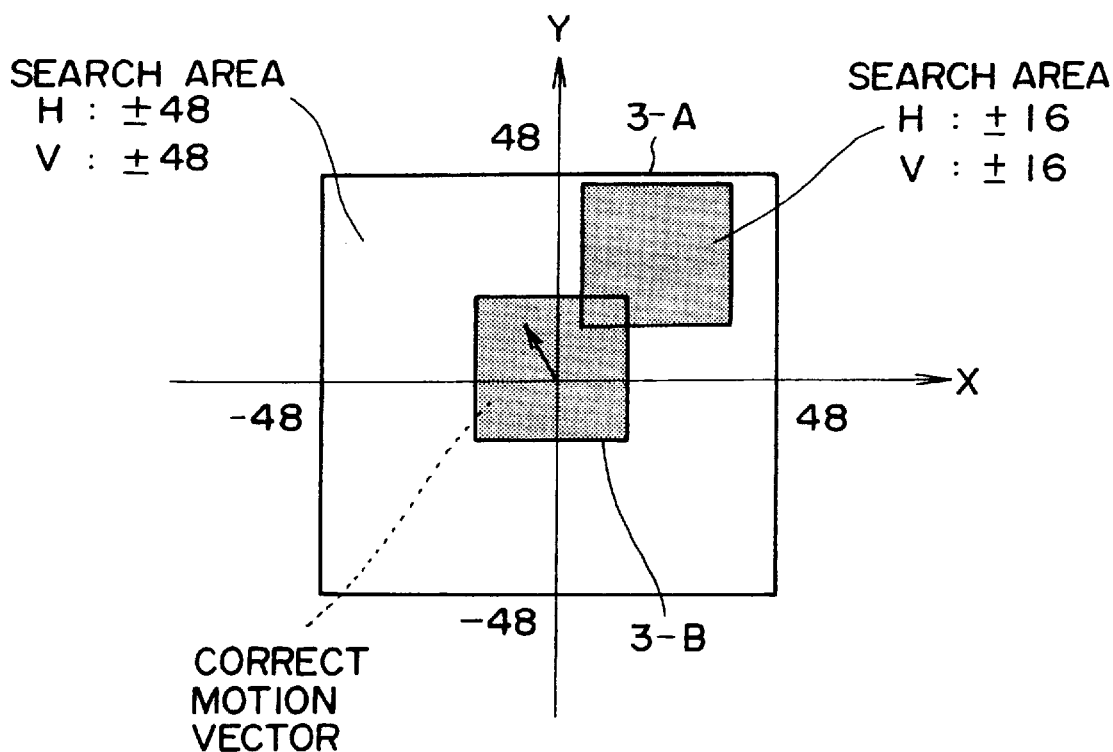
FIG. 10 is an illustration of a search area in regard to a third embodiment of the motion vector detection apparatus of the present invention.

With reference now to FIG. 10 a third embodiment of the motion vector detection circuit of the present invention is explained. Such third embodiment utilizes the form shown in FIG. 3 with certain differences as explained below. In FIG. 10 there is shown the search area of the 1st motion detection circuit 3-A and that of the second motion detection circuit 3-B. In this third embodiment of the invention, the 1st motion detection circuit 3-A performs a conventional telescopic search in a ±16 horizontal×±16 vertical search area centered about (0, 0). The 2nd motion detection circuit 3-B, however, always searches a ±16 horizontal×±16 vertical search area within a larger search area. In the example of FIG. 10, this search area is centered about (0, 0) and is ±48 horizontal by ±48 vertical. Thus, motion vector distribution detection circuit 4' generates a reference data read control signal c based on the motion vectors d1 and d2 and differential factors e1 and e2, but which also permits the conventional telescopic search by 1st motion detection circuit 3-A and fixes the search areas in regard to the search by 2nd motion detection circuit 3-B. This third embodiment of the invention permits the detection of the correct motion vector even when the magnitude of the vectors is small.

Figure 11:
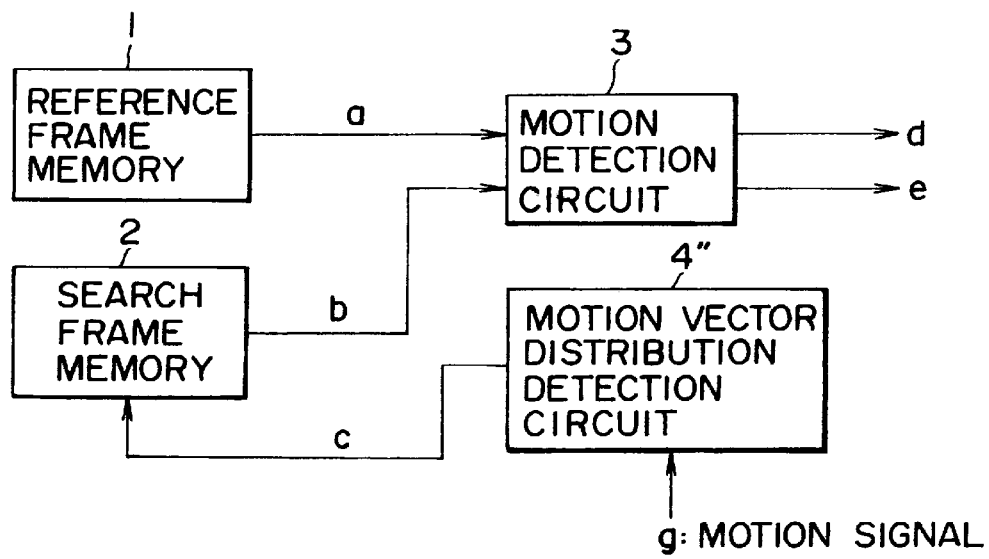
FIG. 11 is a block diagram which illustrates a fourth embodiment of the motion vector detection circuit of the present invention.
Figure 12:
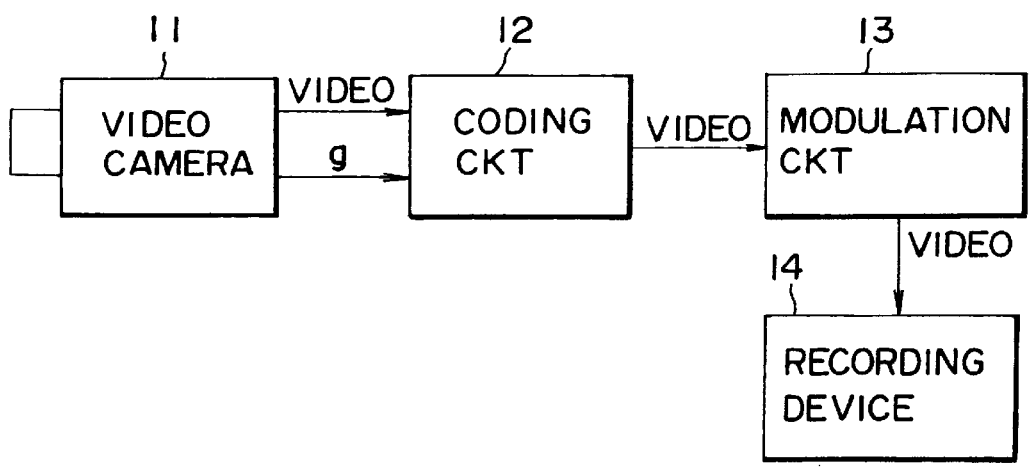
FIG. 12 is a block diagram which illustrates a motion video recording apparatus which includes the motion vector detection circuit of the present invention.

Referring now to FIG. 11, a fourth embodiment of the motion vector detection circuit of the present invention is explained. As is evident by a comparison of FIGS. 1 and 11, this fourth embodiment is basically the same as the motion vector detection circuit of FIG. 1. However, the motion vector distribution detection circuit 4" of FIG. 11 does not utilize use the motion vector d output by motion detection circuit 3 nor differential factor e output by motion detection circuit 3. Instead, the motion vector distribution detection circuit 4" receives a motion signal g from a motion vector detection circuit within a video camera 11 of FIG. 12. Such motion signal is generated by an angular speed sensor and is utilized by the motion vector distribution detection circuit 4" for the purpose of providing picture stabilization of the image provided by video camera 11. In this fourth embodiment, the search area at motion detection circuit 3 becomes the same for all the slices instead of being variable from slice to slice. As shown in FIG. 12, a motion video recording apparatus which includes the motion vector detection circuit of FIG. 11. In FIG. 12, coding circuit 12 basically consists of the MPEG picture coding apparatus of FIG. 13, except that the motion vector detection circuit 21 of such FIG. 13 is that of FIG. 1 and FIG. 11. Thus, the motion video recording apparatus FIG. 12 includes the motion vector detection circuit of the FIGS. 1 and 11.

In operation, video camera 11 outputs a video signal and the motion signal g. The motion vector distribution detection circuit within coding circuit 12 generates the reference data reading control signal c for the search frame memory using the motion signal g which is output by video camera 11. The video signal which is coded by coding circuit 12 modulates a carrier or other signal in modulation circuit 13 and is output for recording by recording device 14. Such recording device 14 may be a hard disk, a magneto-optic disc or a DVD.

It is to be understood that although the invention has been described with respect to specific portions (i.e., right half, left half of the horizontal slice) other shapes of areas may be utilized. Furthermore, although the invention has been described with respect to horizontal slices, the invention may be applied to vertical slices or other shapes of segments of frames or fields. In the present invention, in the case of a search area in the center of a horizontal slice, there is a small the increase of the data transfer rate of the reference data, however, it is possible to temporally absorb such increase during a horizontal blanking interval. This small increase in the data transfer rate is more than compensated, however, by the gains realized by the variableness of the search area. The present invention is also applicable to detection of motion as among fields, where multiple fields are utilized, as in the case of interlacing, to make up a frame.

Thus, in accordance with the present invention, the search area of the motion vector can be expanded without increasing the data transfer rate of the reference data. By having a variable search area picture quality degradation is reduced since small motion vectors are more easily detected. Furthermore, in the case of an error in the determination of a search area mode, the present invention is able to select an adequate search area mode.

Although the term "detection" is utilized with respect to the determination of motion vectors, such detection may be considered to be a method of calculating or estimating motion vectors. Furthermore, although the preferred embodiments of the invention utilize an discrete cosine transforms and inverse discrete cosine transforms, other orthogonal transforms and inverse orthogonal transforms may be utilized.

In addition, although only certain embodiments have been described in detail, those having ordinary skill in the art will certainly understand that many modifications are possible without departing from the teachings hereof. All such modifications are intended to be encompassed within the following claims.

I claim:

1. An apparatus for detecting a motion vector, comprising:
   a motion detection circuit for detection motion based upon calculation of picture data of a reference block and upon picture data in a search block, the search block located within a search area; and
   means for variably setting the search area, wherein the motion detection circuit comprises:
      a first motion detection circuit for detection motion within a fixed search area; and
      a second motion detection circuit for detecting motion within a variable search area.

2. The apparatus of claim 1, wherein the means for variably setting the search area sets the search area to be one of in a level direction and in a perpendicular direction.

3. The apparatus of claim 1, wherein the fixed search area is centered about a plurality of variable search areas.

4. A method of detecting a motion vector, comprising the steps of:
   detecting motion based upon calculation of picture data of a reference block and upon picture data in a search block, the search block located within a search area; and
   variably setting the search area, wherein the step of detecting motion further comprises the steps of:
      detecting motion within a fixed search area; and
      separately detecting motion within a variable search area.

5. The method of claim 4, further comprising the step of:
   setting the search area to be one of in a level direction and in a perpendicular direction.

6. The method of claim 4, wherein the fixed search area is centered about a plurality of variable search areas.

7. An apparatus for detecting motion vectors, comprising:
   a reference frame memory operative to generate a reference frame signal;
   a search frame memory operative to generate a search frame signal;
   a motion detection circuit operative to generate a motion vector and a differential factor based upon the reference frame signal and the search frame signal; and
   a motion vector distribution detection circuit operative to generate, based upon the motion vector and the differential factor, a read control signal for variably controlling a search area of the search frame memory.

8. A method of detecting motion vectors, comprising the steps of:
   generating a reference frame signal based upon pixels of a reference frame;
   generating a search frame signal based upon pixels of a search frame;
   generating a motion vector and a differential factor based upon the reference frame signal and the search frame signal; and
   based upon the motion vector and the differential factor, generating a read control signal for variably controlling a search area of the search frame.

9. An apparatus for detecting motion vectors, comprising:
   a reference frame memory operative to generate a reference frame signal;
   a search frame memory operative to generate a search frame signal;
   a first motion detection circuit operative to generate, for a fixed search area, a first motion vector and a first differential factor based upon a the reference frame signal and the search frame signal;
   a second motion detection circuit operative to generate, for a variable search area, a second motion vector and a second differential factor based upon the reference frame signal and the search frame signal;
   a motion vector distribution detection circuit operative to generate, based upon the first and second motion vectors and the first and second differential factors, a read control signal for variably controlling a search area of the search frame memory; and
   a comparing circuit for generating an output motion vector based upon the first and second motion vectors and the first and second differential factors.

10. A method of detecting motion vectors, comprising the steps of:
    generating a reference frame signal based upon pixels of a reference frame;
    generating a search frame signal based upon pixels of a search frame;
    generating a first motion vector and a first differential factor based upon the reference frame signal and the search frame signal;

generating a second motion vector and a second differential factor based upon the reference frame signal and the search frame signal;

based upon the first and second motion vectors and the first and second differential factors, generating a read control signal for variably controlling a search area of the search frame; and generating an output motion vector based upon a comparison of the first and second motion vectors and a comparison of the first and second differential factors.

11. An apparatus for detecting motion vectors, comprising:

a reference frame memory operative to generate a reference frame signal;

a search frame memory operative to generate a search frame signal;

a first motion detection circuit operative to generate, for a telescoping search area, a first motion vector and a first differential factor based upon a the reference frame signal and the search frame signal;

a second motion detection circuit operative to generate, for a variable search area within a larger search area, a second motion vector and a second differential factor based upon the reference frame signal and the search frame signal;

a motion vector distribution detection circuit operative to generate, based upon the first and second motion vectors and the first and second differential factors, a read control signal for variably controlling a search area of the search frame memory; and a comparing circuit for generating an output motion vector based upon the first and second motion vectors and the first and second differential factors.

12. A method of detecting motion vectors, comprising the steps of:

generating a reference frame signal based upon pixels of a reference frame;

generating a search frame signal based upon pixels of a search frame;

generating a first motion vector and a first differential factor based upon the reference frame signal and a telescopic search frame signal;

generating a second motion vector and a second differential factor based upon the reference frame signal and the search frame signal;

based upon the first and second motion vectors and the first and second differential factors, generating a read control signal for variably controlling a search area of the search frame; and generating an output motion vector based upon a comparison of the first and second motion vectors and a comparison of the first and second differential factors.

13. An apparatus for detecting motion vectors, comprising:

a reference frame memory operative to generate a reference frame signal;

a search frame memory operative to generate a search frame signal;

a motion detection circuit operative to generate a motion vector and a differential factor based upon the reference frame signal and the search frame signal;

a sensor for generating a motion signal based upon motion of a video camera; and a motion vector distribution detection circuit operative to generate, based upon the motion signal, a reference data reading control signal for stabilizing images generated by the video camera.

14. A method of detecting motion vectors, comprising the steps of:

generating a reference frame signal based upon pixels of a reference frame;

generating a search frame signal based upon pixels of a search frame;

generating a motion vector and a differential factor based upon the reference frame signal and the search frame signal;

generating a motion signal based upon motion of a video camera; and generating, based upon the motion signal, a reference data reading control signal for stabilizing images generated by a video camera.

15. A method of detecting motion vectors, comprising the steps of:

generating a reference frame signal based upon pixels of slice of a reference frame;

generating a search frame signal based upon pixels of a corresponding slice of a search frame;

generating motion vectors based upon the reference frame signal and the search frame signal;

selecting a search mode to be a stationary mode if a number of the motion vectors within a first area is at least a first threshold value;

determining whether the search mode is an active mode if the number of the motion vectors within a first area is less than the first threshold value;

setting a first central vector based upon a central search area and a second central vector based upon a search area corresponding to the active mode; and generating an output motion vector based upon first and second central vectors and a comparison of differential factors based upon the reference frame signal and the search frame signal.

16. The method of claim 15, further comprising the steps of:

selecting the active mode to be a horizontal/vertical mode if a number of the motion vectors within a second area is at least a second threshold value; and determining whether the active mode is a diagonal mode if the number of the motion vectors within the second area is less than the second threshold value;

selecting the active mode to be the diagonal mode if the number of the motion vectors within a third area is at least a third threshold value; and setting the mode to be the stationary mode if the number of the motion vectors within the third area is less than the third threshold value.

* * * * *

UNITED STATES PATENT AND TRADEMARK OFFICE
CERTIFICATE OF CORRECTION

PATENT NO. : 5,872,604
DATED : February 16, 1999
INVENTOR(S) : EIJI OGURA

It is certified that error appears in the above-identified patent and that said Letters Patent is hereby corrected as shown below:

At Col. 15, line 19, please delete "a".

Signed and Sealed this

Sixth Day of July, 1999

Attest:

Q. TODD DICKINSON

*Attesting Officer*  *Acting Commissioner of Patents and Trademarks*